(12) United States Patent
Maegawa

(10) Patent No.: US 7,721,591 B2
(45) Date of Patent: May 25, 2010

(54) ABNORMALITY DIAGNOSIS APPARATUS FOR INTERNAL COMBUSTION ENGINE

(75) Inventor: Yoshinori Maegawa, Obu (JP)

(73) Assignee: DENSO Corporation, Kariya (JP)

( * ) Notice: Subject to any disclaimer, the term of this patent is extended or adjusted under 35 U.S.C. 154(b) by 29 days.

(21) Appl. No.: 11/929,235

(22) Filed: Oct. 30, 2007

(65) Prior Publication Data

US 2008/0110239 A1  May 15, 2008

(30) Foreign Application Priority Data

Nov. 10, 2006  (JP) ............................. 2006-305613

(51) Int. Cl.
*F01N 11/00* (2006.01)
(52) U.S. Cl. .................... 73/114.72; 73/23.32
(58) Field of Classification Search ................ 73/23.32, 73/114.02, 114.72
See application file for complete search history.

(56) References Cited

U.S. PATENT DOCUMENTS

| | | | |
|---|---|---|---|
| 5,542,404 A | 8/1996 | Hasegawa et al. | |
| 7,051,725 B2 | 5/2006 | Ikemoto et al. | |
| 7,063,080 B2 | 6/2006 | Kita et al. | |
| 7,195,008 B2 * | 3/2007 | Annoura et al. | 123/674 |
| 7,243,532 B2 * | 7/2007 | Tsujimura et al. | 73/114.02 |
| 7,356,985 B2 * | 4/2008 | Hirata et al. | 60/274 |
| 7,487,035 B2 * | 2/2009 | Nozawa et al. | 701/114 |
| 2005/0022797 A1 * | 2/2005 | Ikemoto et al. | 123/673 |
| 2005/0120786 A1 * | 6/2005 | Tsujimura et al. | 73/119 R |
| 2007/0240695 A1 | 10/2007 | Mitsuda et al. | |

FOREIGN PATENT DOCUMENTS

JP  1-237336  9/1989

* cited by examiner

*Primary Examiner*—Lisa M Caputo
*Assistant Examiner*—Freddie Kirkland, III
(74) *Attorney, Agent, or Firm*—Nixon & Vanderhye P.C.

(57) ABSTRACT

A cylinder deviation of an actual air-fuel ratio before an air-fuel-ratio dither control is obtained based on a variation of an actual air-fuel ratio by the dither control, a variation amount of detected air-fuel ratio, and a cylinder deviation of detected air-fuel ratio before the dither control. A cylinder deviation of actual air-fuel ratio of each cylinder is accurately estimated. When the number of times in which the cylinder deviation of air-fuel ratio exceeds a decision value is greater than a predetermined number, it is determined that an abnormality occurs in the cylinder.

6 Claims, 8 Drawing Sheets

ABNORMALITY DIAGNOSIS APPARATUS FOR INTERNAL COMBUSTION ENGINE

CROSS-REFERENCE TO RELATED APPLICATION

This application is based on Japanese Patent Application No. 2006-305613 filed on Nov. 10, 2006, the disclosure of which is incorporated herein by reference.

FIELD OF THE INVENTION

The present invention relates to an abnormality diagnosis apparatus for an internal combustion engine, which performs an abnormality diagnosis based on an output of an air-fuel ratio sensor with respect to each cylinder.

BACKGROUND OF THE INVENTION

In order to improve the accuracy of an air-fuel ratio control of an internal combustion engine, as shown in Japanese Patent No. 2684011 (U.S. Pat. No. 5,542,404), there has been performed a cylinder air-fuel ratio control that performs the cylinder air-fuel ratio estimate of estimating the air-fuel ratio of each cylinder by the use of a model for relating the detection value of one air-fuel sensor disposed in an exhaust confluent portion where exhaust gases from plural cylinders merge with each other (air-fuel ratio of the exhaust confluent portion) to the air-fuel ratio of each cylinder, and computes an air-fuel ratio correction quantity for each cylinder so as to reduce variation in the air-fuel ratio of each cylinder between the cylinders based on the estimate result of the cylinder air-fuel ratio estimate and controls the air-fuel ratio of each cylinder (fuel injection quantity) based on the air-fuel ratio correction quantity for each cylinder. In a control unit described in Japanese Patent No. 2684011, it is performed the cylinder abnormality diagnosis of determining whether or not the air-fuel ratio feedback correction quantity for each cylinder is within a specified range, and determining that an abnormality (for example, malfunction of an injector) occurs in a cylinder when an air-fuel ratio feedback correction quantity for the cylinder is beyond the specified range.

A hit condition of the exhaust gas as opposed to the air fuel ratio sensor may be changed according to a structure of an exhaust pipe of the internal combustion engine. The detected air-fuel ratio may deviate from an actual air fuel ratio sensor In a control unit described in Japanese Patent No. 2684011, since the deviation of detected air-fuel ratio due to the hit condition of the exhaust gas is not considered, the accuracy of the abnormality diagnosis based on the air-fuel ratio sensor output including the deviation may be deteriorated.

SUMMARY OF THE INVENTION

An object of the present invention is to provide an abnormality diagnosis apparatus based on the air-fuel ratio sensor output, which enhances its accuracy of the cylinder abnormality diagnosis.

According to the invention, an abnormality diagnosis apparatus for an internal combustion engine includes an air-fuel ratio sensor provided in a confluent portion of exhaust gas discharged from each cylinder of the internal combustion engine, and detecting air-fuel ratio of the exhaust gas. The diagnosis apparatus further includes an information detecting means for estimating an air-fuel ratio of each cylinder or a cylinder deviation of the air-fuel ratio based on an output of the air-fuel ratio sensor while an air-fuel-ratio dither control is performed for compulsorily varying the air-fuel ratio of each cylinder. Furthermore, the abnormality diagnosis apparatus includes an abnormality determination means for determining that an abnormality occurs in a specified cylinder when a number of times in which the air-fuel ratio of the specified cylinder estimated by the information detecting means or a cylinder deviation of the air-fuel ratio exceeds a decision value is greater than a predetermined number.

An actual air-fuel ratio before performing air-fuel-ratio dither control can be obtained based on a variation quantity of the actual air-fuel ratio, a variation quantity of the air-fuel ratio detected by the air-fuel ratio sensor, and a detected air-fuel ratio just before the air-fuel ratio control is performed. Thereby, even if the detected air-fuel ratio deviates from the actual air-fuel ratio, the actual air-fuel ratio of each cylinder (the cylinder deviation of the air-fuel ratio) can be obtained with high accuracy. While the engine is operated, when the number of times in which the air-fuel ratio or a cylinder deviation of a specified cylinder exceeds a decision value is greater than a predetermined number, it is determined that an abnormality occurs in the specified cylinder. Hence, the cylinder abnormal diagnosis is performed with high accuracy.

According to another aspect of the invention, an abnormality diagnosis apparatus estimates an air-fuel ratio of each cylinder or a cylinder deviation of the air-fuel ratio based on an output of the air-fuel ratio sensor with respect to every region of a plurality of abnormality diagnosis areas which is defined according to an engine driving condition, and determines that an abnormality occurs in a specified cylinder when the air-fuel ratio or the cylinder deviation of the specified cylinder exceeds a decision value in all abnormality diagnosis areas.

Even in a region in which a deviation of the detected air-fuel ratio becomes relatively large, the abnormality of each cylinder can be well detected.

According to another aspect of the invention, it is determined that an abnormality occurs in a specified cylinder when the air-fuel ratio or the cylinder deviation of the specified cylinder exceeds a decision value in a predetermined number of the abnormality diagnosis area or more.

DETAILED DESCRIPTION OF EMBODIMENTS

A best mode of the present invention will be described hereinafter.

First Embodiment

Referring to FIGS. 1 to 5, a first embodiment of the present invention is explained.

Figure 1:
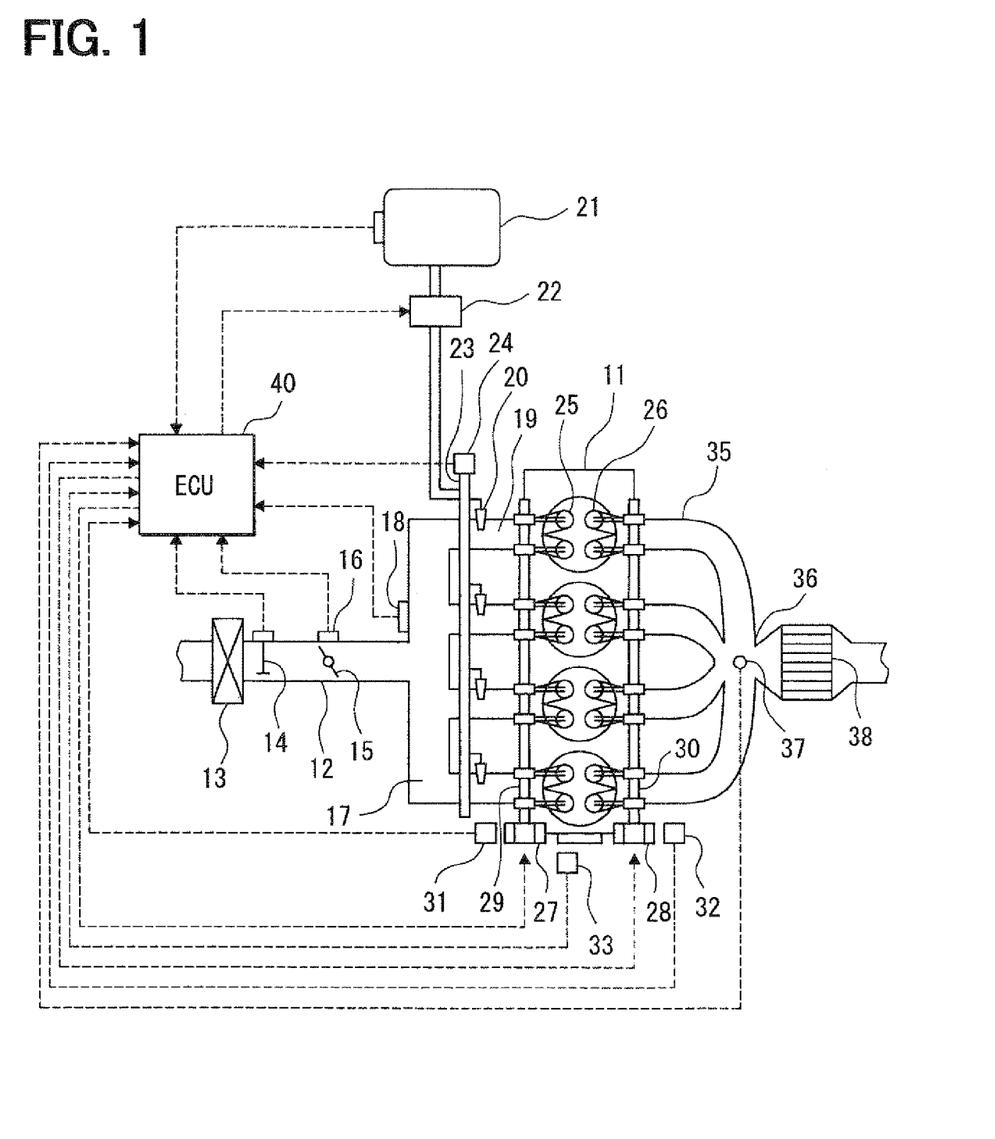
FIG. 1 is a schematic view of an engine control system according to a first embodiment.

Referring to FIG. 17 a structure of the whole engine control system is explained. An air cleaner 13 is arranged upstream of an intake pipe 12 of an internal combustion engine 11, such as an in-line four-cylinder engine. An airflow meter 14 detecting an intake air flow rate is provided downstream of the air cleaner 13. A throttle valve 15 driven by a DC-motor and a throttle position sensor 16 detecting a throttle position are provided downstream of the air flow meter 14.

A surge tank 17 including an intake air pressure sensor 18 is provided down steam of the throttle valve 15. The intake air pressure sensor 18 detects intake air pressure. An intake manifold 19 which introduces air into each cylinder of the engine 11 is provided downstream of the intake pipe 12, and the fuel injector 20 which injects the fuel is provided at a vicinity of an intake port of the intake manifold 19 of each cylinder. While the engine 11 is operated, fuel in a fuel tank 21 is sent to a delivery pipe 23 by a fuel pump 22 and is injected from the fuel injector 20 of the respective cylinders at the injection timings of the respective cylinders. The delivery pipe 23 is provided with a fuel pressure sensor 24 for detecting a fuel pressure.

Moreover, the engine 11 is provided with variable valve timing mechanisms 27, 28 that vary the opening/closing timings of intake valves 25 and exhaust valves 26, respectively. The engine 11 is provided with an intake cam angle sensor 31 and an exhaust cam angle sensor 32 that output cam angle signals in synchronization with the rotations of an intake camshaft 29 and an exhaust camshaft 30, respectively. Further, the engine 11 is provided with a crank angle sensor 33 for outputting the pulse of a crank angle signal at intervals of a specified crank angle (for example, at intervals of 30° CA) in synchronization with the rotation of the crankshaft of the engine 11.

An air-fuel ratio sensor 37 for detecting an air-fuel ratio of exhaust gas is disposed in an exhaust confluent portion 36 where the exhaust manifolds 35 of the respective cylinders of the engine 11 merges together. A catalyst 38 such as a three-way catalyst for cleaning CO, HC, NOx in the exhaust gas is disposed downstream of the air-fuel ratio sensor 37.

The outputs of various sensors such as the air-fuel ratio sensor 37 are inputted to an engine control unit (hereinafter denoted as "ECU") 40. The engine control unit 40 is mainly constructed of a microcomputer and executes various engine control programs stored in a built-in ROM (storage medium) to control the fuel injection quantities and the ignition timings of the fuel injector 20 of the respective cylinders according to an engine operating state.

Figure 3:
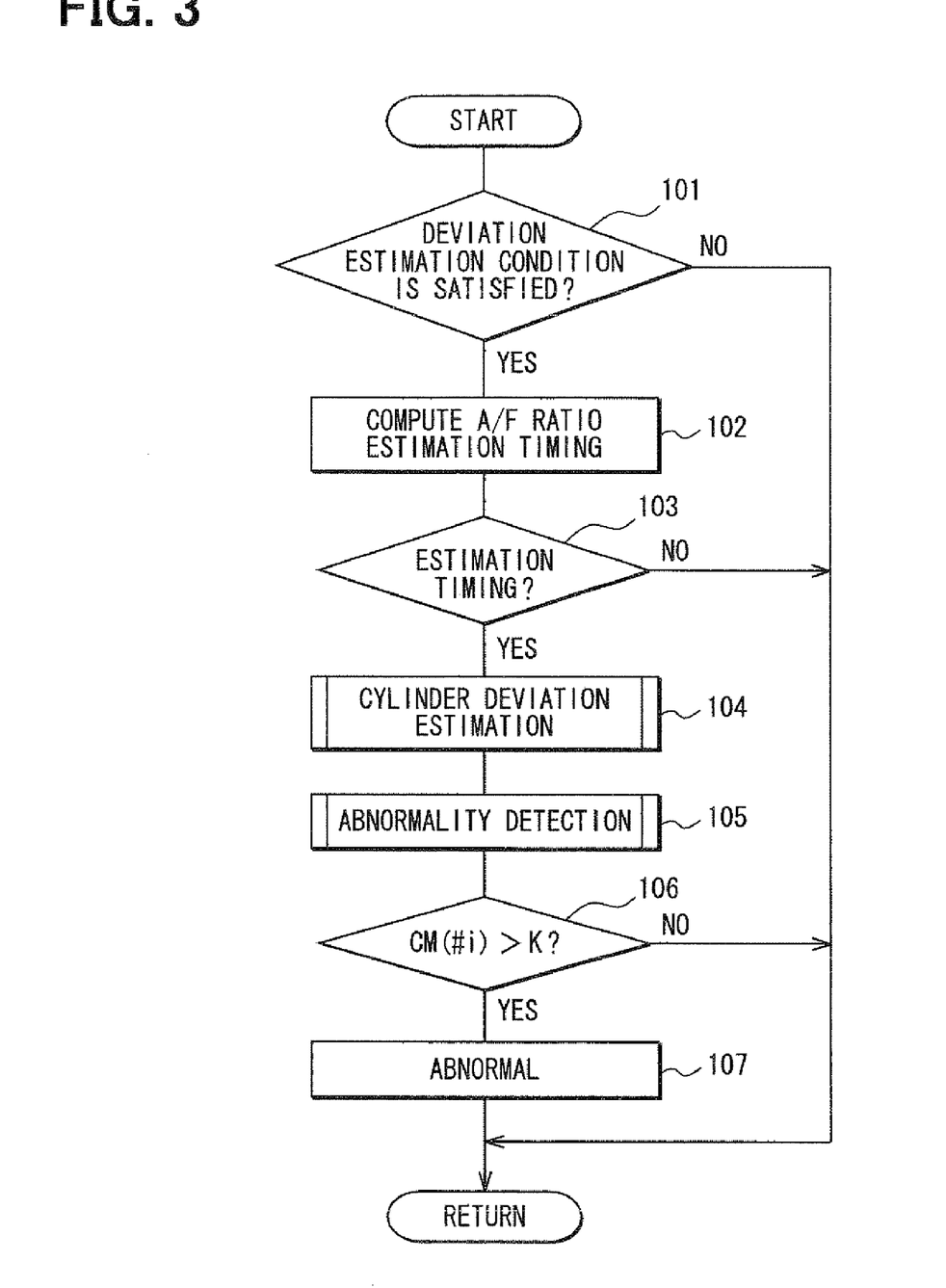
FIG. 3 is a flowchart for explaining a process of a cylinder abnormality estimation main routine according to the first embodiment.
Figure 4:
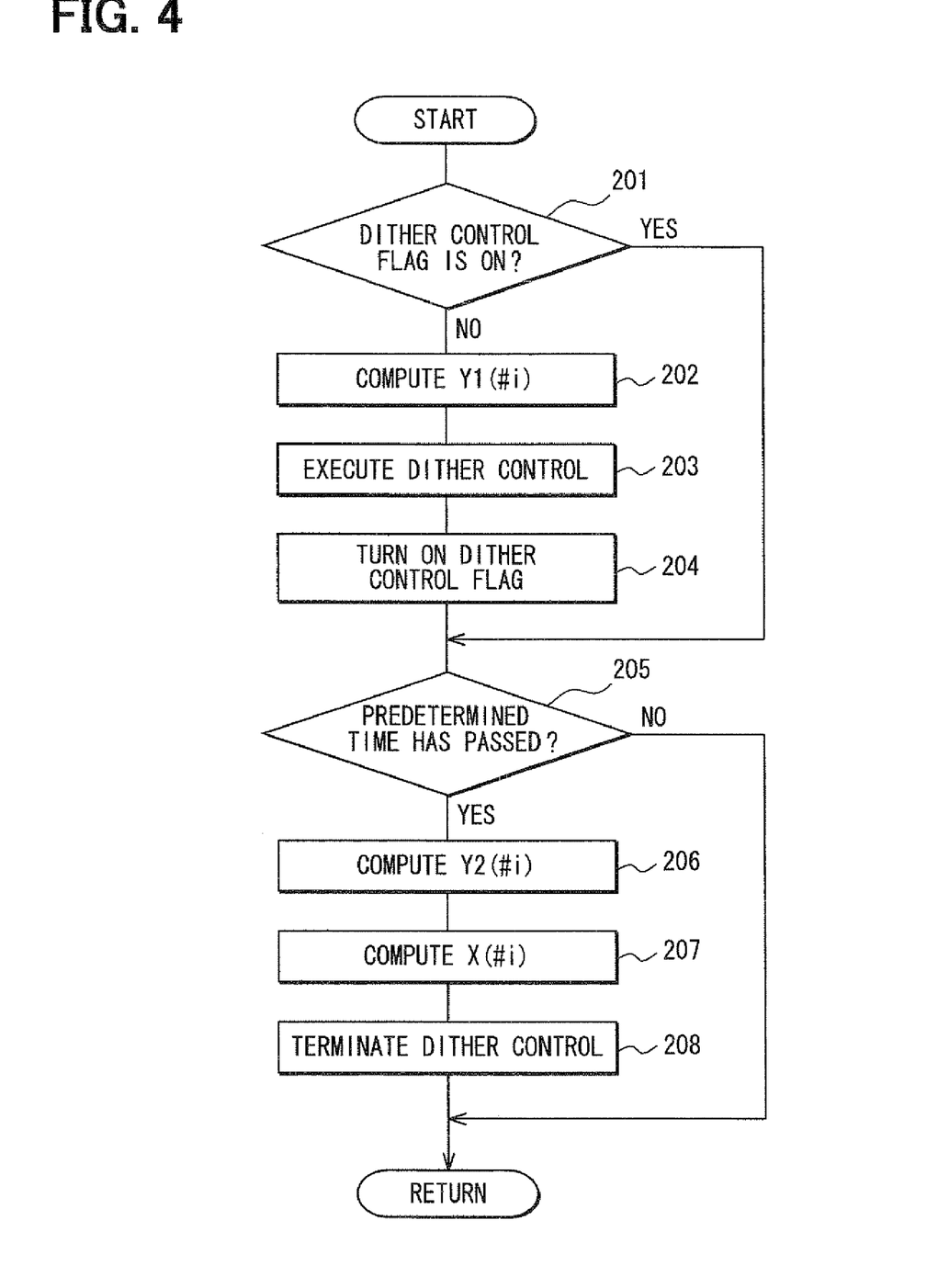
FIG. 4 is a flowchart for explaining a process of a cylinder deviation estimation routine according to the first embodiment.
Figure 5:
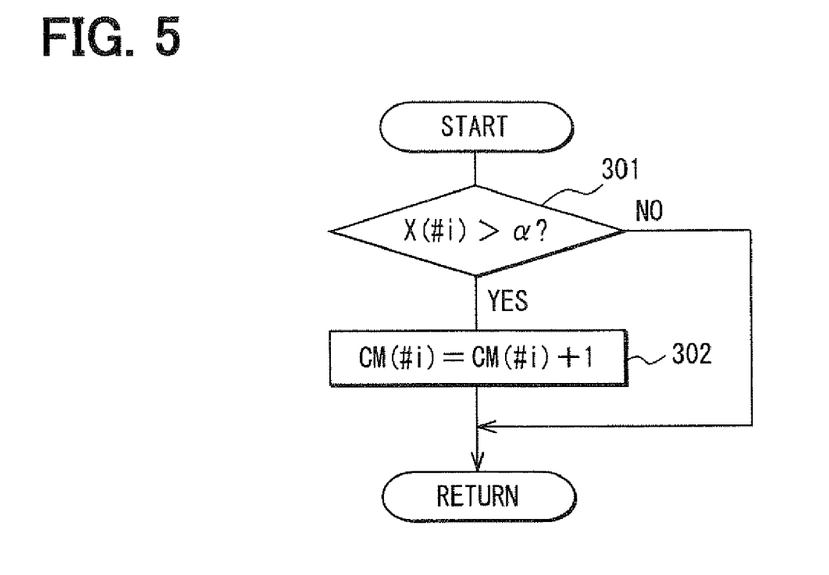
FIG. 5 is a flowchart for explaining a process of an abnormality detection routine according to the first embodiment.

Moreover, the ECU 40 executes a cylinder diagnosis routine shown in FIGS. 3 to 5 to detect abnormality of each cylinder. When a deviation estimate condition is established, an air-fuel ratio dither control is performed, in which air-fuel ratio of each cylinder is compulsory changed. Based on output of the air-fuel ratio sensor 37 in the dither control, cylinder deviations $X(\#1)$-$X(\#4)$ of each cylinder (first cylinder #1-fourth cylinder #4) are estimated.

Figure 2A:
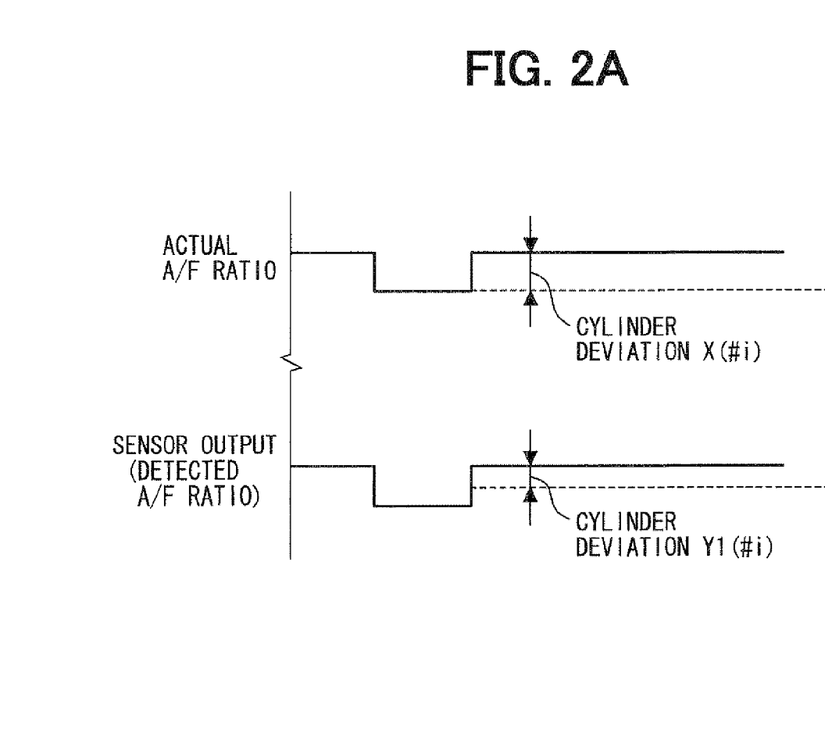
FIG. 2A and FIG. 2B are charts for explaining a method of computing a cylinder deviation of an air-fuel ratio.

Specifically, as shown in FIG. 2 A, in the i-th cylinder #i (i=1-4), a deviation $Y1(\#i)$ between a detected air-fuel ratio and a reference air-fuel ratio is computed. The detected air-fuel ratio is detected by the air-fuel ratio sensor 37 before the air-fuel ratio dither control is executed. Thereby, the cylinder deviation $Y1(\#i)$ of the detected air-fuel ratio of the i-th cylinder #i is computed before the air-fuel-ratio dither control is executed. Here, the reference air-fuel ratio is established as the average value of the air fuel ratio of all the cylinders detected by the air fuel ratio sensor 37 before the air-fuel-ratio dither control is started. Alternatively, the reference air-fuel ratio may be established as a predetermined fixed value (for example, 14.7).

Figure 2B:
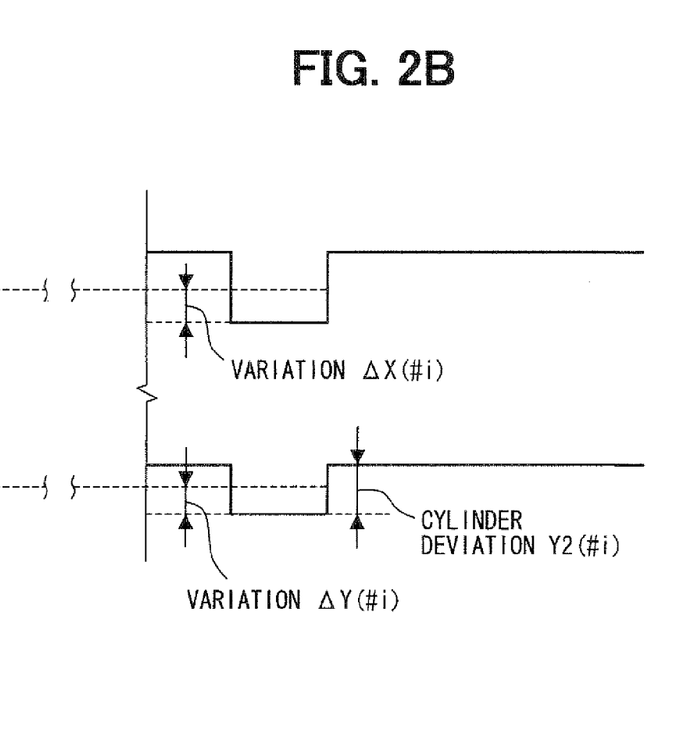

Then, the air-fuel-ratio dither control is performed, in which the air-fuel ratio of i-th cylinder #i is compulsorily changed by a predetermined variation $\Delta X(\#i)$ in a rich direction or a lean direction. As shown in FIG. 2B, a cylinder deviation $Y2(\#i)$ is computed after the air-fuel-ratio dither control is executed. The deviation $Y2(\#i)$ is a deviation between a detected air-fuel ratio of i-th cylinder #i and the reference air-fuel ratio.

A deviation $X(\#i)$ of the actual air-fuel ratio before performing the air-fuel-ratio dither control is computed according to a following equation.

$$X(\#i)=\Delta X(\#i) \times Y1(\#i)/\Delta Y(\#i)=\Delta X(\#i) \times Y1(\#i)/\{Y2(\#i)-Y1(\#i)\}$$

$\Delta X(\#i)$ represents the variation of the actual air-fuel ratio when changing compulsorily the air-fuel ratio (for example, fuel injection quantity) of i-th cylinder #i by air-fuel-ratio dither control. $\Delta Y(\#i) \{=Y2(\#i)-Y1(\#i)\}$ represents the variation of the air fuel ratio detected by the air fuel ratio sensor 37. $Y1(\#i)$ represents the deviation of the air fuel ratio detected by the air fuel ratio sensor 37 between the cylinders before starting the air-fuel-ratio dither control.

During an engine operating period (for example, the ECU 40 is ON), the computer counts a number of times in which the deviation $X(\#i)$ between the cylinders of the air-fuel ratio exceeds a decision value $\alpha$. When the count value becomes larger than a predetermined number of times K, it is determined that the abnormalities (for example, deterioration of the injector 20, a clogging of a injection port, the deposit of an EGR port, a characteristic abnormalities of the variable valve timing mechanism or the adjustable valve lift device, and the like) have occurred in the cylinder.

Hereafter, the content of processing of each program for the abnormality diagnoses for each cylinder is explained,

[Abnormality-Diagnosis Main Routine]

The abnormality-diagnosis main routine shown in FIG. 3 is performed in a predetermined period (for example, 30° C.A) during engine operation. In step 101, it is determined whether a deviation estimation condition is satisfied. Here, as the deviation estimation condition, the following conditions (1) and (2) are determined, for example.

(1) An engine operation condition is stable state.

(2) An air fuel ratio sensor 37 is active state.

It is determined whether the engine operation condition is stable state based on whether intake air quantity is less than a predetermined value, whether an engine speed is within a predetermined range, or whether an engine load (intake air quantity or and intake pipe pressure) is higher than a predetermined value.

When the above conditions (1) and (2) are satisfied, the deviation estimation condition is established. When at least one of the above conditions (1) and (2) is not satisfied, the deviation estimation condition is not established.

When the answer is Yes in step 101, the procedure proceeds to step 102 in which an air-fuel-ratio estimation timing is computed based on the engine speed and the engine load. The air-fuel-ratio estimation timing corresponds to timing at which the air-fuel ratio of the i-th cylinder #1 is detected by the air-fuel ratio sensor 37.

Then, the procedure proceeds to step 103 in which it is determined whether a present crank angle is the air-fuel-ratio estimation timing. When the answer is Yes in step 103, the procedure proceeds to step 104 in which a deviation estimation routine shown in FIG. 4 is executed to compute the cylinder deviation X(#i) of the i-th cylinder #i.

Then, the procedure proceeds to step 105 in which an abnormality detection routine shown in FIG. 5 is executed. In the abnormality detection routine, a count value of an abnormality determination counter CM(#1) of the i-th cylinder #1 is incremented every time when the cylinder deviation X(#i) exceeds the decision value α during the engine operation period.

Then, the procedure proceeds to step 106 in which it is determined whether the number of time in which the cylinder deviation X(#i) of the i-th cylinder #1 exceeds the decision value α is larger than the predetermined value K. That is, it is determined whether the count value of the counter CM(#i) of the i-th cylinder #i is larger than the predetermined value K.

When the answer is Yes in step 106, the procedure proceeds to step 107 in which it is determined an abnormality occurs in the i-th cylinder #i to turn ON an abnormality flag. A warning lump (not shown) provided on an instrument panel is turned ON. The abnormality information (abnormality code) is stored in a backup RAM of the ECU 40. Then, the present routine ends.

When the answer is No in step 106, it is determined that the i-th cylinder #i is normal to end the routine.

[Cylinder Deviation Estimation Routine]

A cylinder deviation estimation routine shown in FIG. 4 is a subroutine which is executed in step 104 of the main routine shown in FIG. 3. In step 201, it is determined whether an air-fuel-ratio dither control flag is ON. When the flag is ON, an air-fuel-ratio dither control is executed.

When the answer is No in step 201, the procedure proceeds to step 202 in which the cylinder deviation Y1(#i) of the cylinder #i before the engine start is computed. That is, the cylinder deviation Y1 (#1) is derived from a deviation between the air-fuel ratio detected by the air-fuel ratio sensor 37 and the reference air-fuel ratio.

Then, the procedure proceeds to step 203 in which the air-fuel-ratio dither control is executed. In the air-fuel-ratio dither control, the air-fuel ratio of the i-th cylinder #i is compulsorily changed by a predetermined variation quantity ΔX(#i) in a rich direction or a lean direction. For example, an injection quantity by the injector 20 of the i-th cylinder #i is increased or decreased to compulsorily change the air-fuel ratio by the predetermined quantity ΔX. The fuel injection quantity can be changed under a condition that intake air quantity is constant, whereby the air-fuel ratio can be correctly changed by the quantity ΔX.

In a system where a throttle valve is provided for each cylinder, the air-fuel ratio of the i-th cylinder may be compulsorily changed by adjusting an opening degree of the throttle valve of the i-th cylinder #1 to adjust intake air quantity. The intake air quantity can be changed under a condition that fuel injection quantity is constant, whereby the air-fuel ratio can be accurately changed by the quantity ΔX.

Then, the procedure proceeds to step 204 in which the air-fuel-ratio dither control flag is turned ON, and proceeds to step 205.

When the answer is Yes in step 201, the procedure proceeds to step 205.

In step 205, it is determined whether a predetermined time period has passed since the air-fuel-ratio dither control is started. The predetermined time period is required for the air-fuel ratio sensor 37 to detect the air-fuel ration of exhaust gas from the i-th cylinder #i after the air-fuel ratio is compulsorily changed. When the answer is Yes in step 205, the procedure proceeds to step 206 in which the cylinder deviation Y2(#i) between the detected air-fuel ratio and the reference ratio is computed. The air-fuel ratio is detected after the air-fuel-ratio dither control is started.

Then, the procedure proceeds to step 207 in which the cylinder deviation X(#i) of the actual air-fuel ratio before performing the air-fuel-ratio dither control is computed according to a following equation.

$$X(\#i) = \Delta X(\#i) \times Y1(\#i) / \Delta Y(\#i) = \Delta X(\#i) \times Y1(\#i) / \{Y2(\#i) - Y1(\#i)\}$$

ΔX (#i) represents the variation of the actual air-fuel ratio when changing compulsorily the air-fuel ratio of the i-th cylinder #i by air-fuel-ratio dither control. ΔY (#i) {=Y2(#i)−Y1 (#i)} represents the variation of the air fuel ratio detected by the air fuel ratio sensor 37. Y1 (#i) represents the deviation of the air fuel ratio detected by the air fuel ratio sensor 37 before starting the air-fuel-ratio dither control.

Then, the procedure proceeds to step 208 in which the air-fuel-ratio dither control is terminated and the air-fuel-ratio dither control flag is turned OFF to end the routine.

[Abnormality Detection Routine]

FIG. 5 is an abnormality detection routine which is executed in step 105 of the main routine. In step 301, it is determined whether the cylinder deviation ΔX(#i) of the i-th cylinder #i is larger than the decision value α. When the answer is Yes in step 301, the procedure proceeds to step 302 in which the counter value of the counter CM(#1) of the i-th cylinder is incremented by "1".

$$CM(\#i) = CM(\#i) + 1$$

When the answer is No in step 301, the procedure ends without incrementing the counter value.

According to the first embodiment, the cylinder deviation X(#i) is computed before the dither control is performed based on the variation ΔX(#i), the variation ΔY(#i){=Y2(#i)−Y1(#i)} and the cylinder deviation Y1(#i). Hence, even when the air-fuel ratio detected by the air-fuel ratio sensor 37 deviates from the actual air-fuel ratio, the cylinder deviation X(#i) of the actual air-fuel ratio for each cylinder can be accurately estimated.

The number of times in which the cylinder deviation X(#i) exceeds the decision value α is counted. When the count number exceeds the predetermined number K, it is determined that the abnormality occurs in the cylinder. Hence, the abnormality of each cylinder is accurately detected.

When the number of times in which the air-fuel ratio of a certain cylinder exceeds the decision value is greater than a predetermined number, it can be determined that an abnormality occurs in the cylinder.

Second Embodiment

Figure 6:
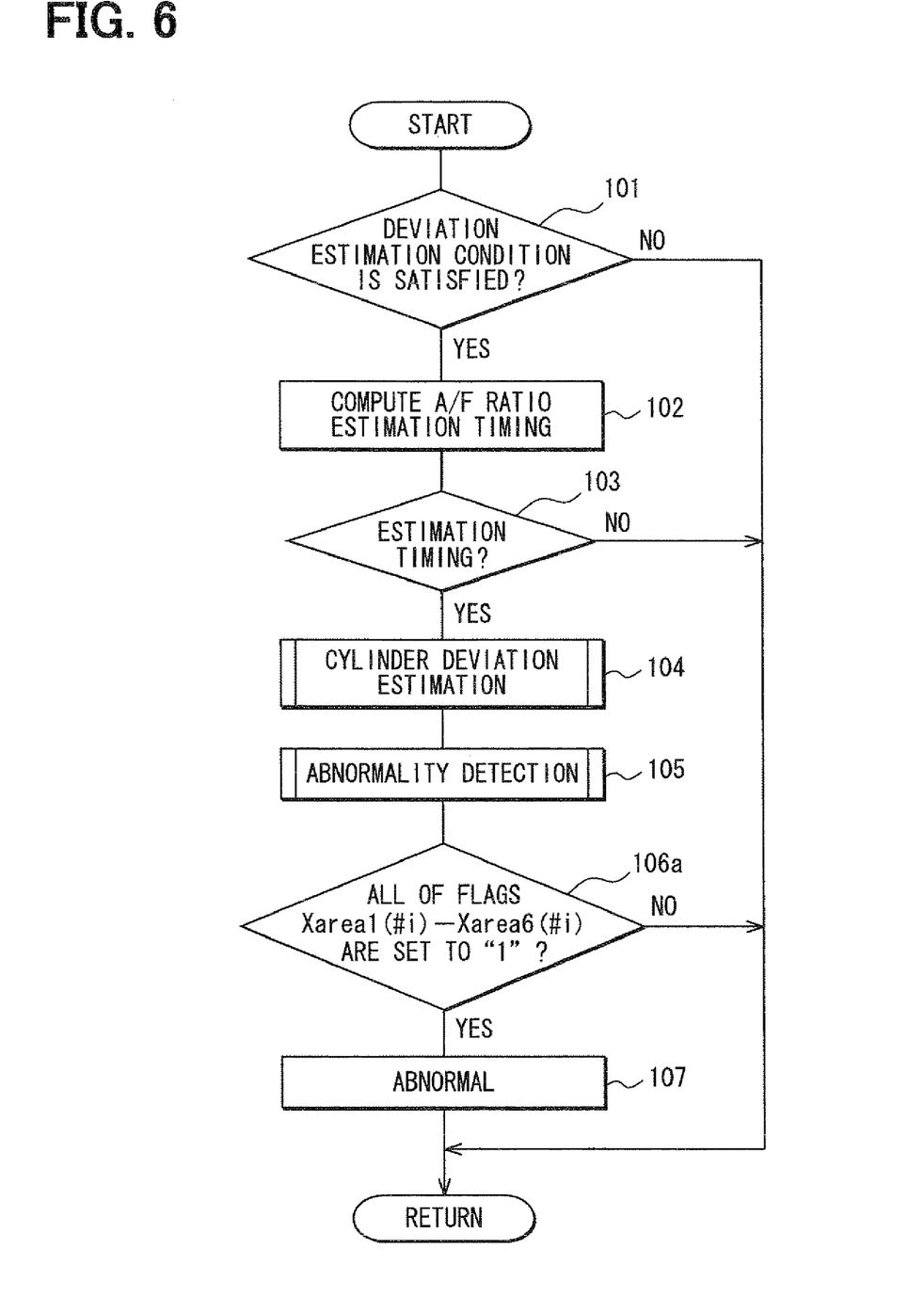
FIG. 6 is a flowchart for explaining a process of a cylinder abnormality estimation main routine according to a second embodiment.
Figure 7:
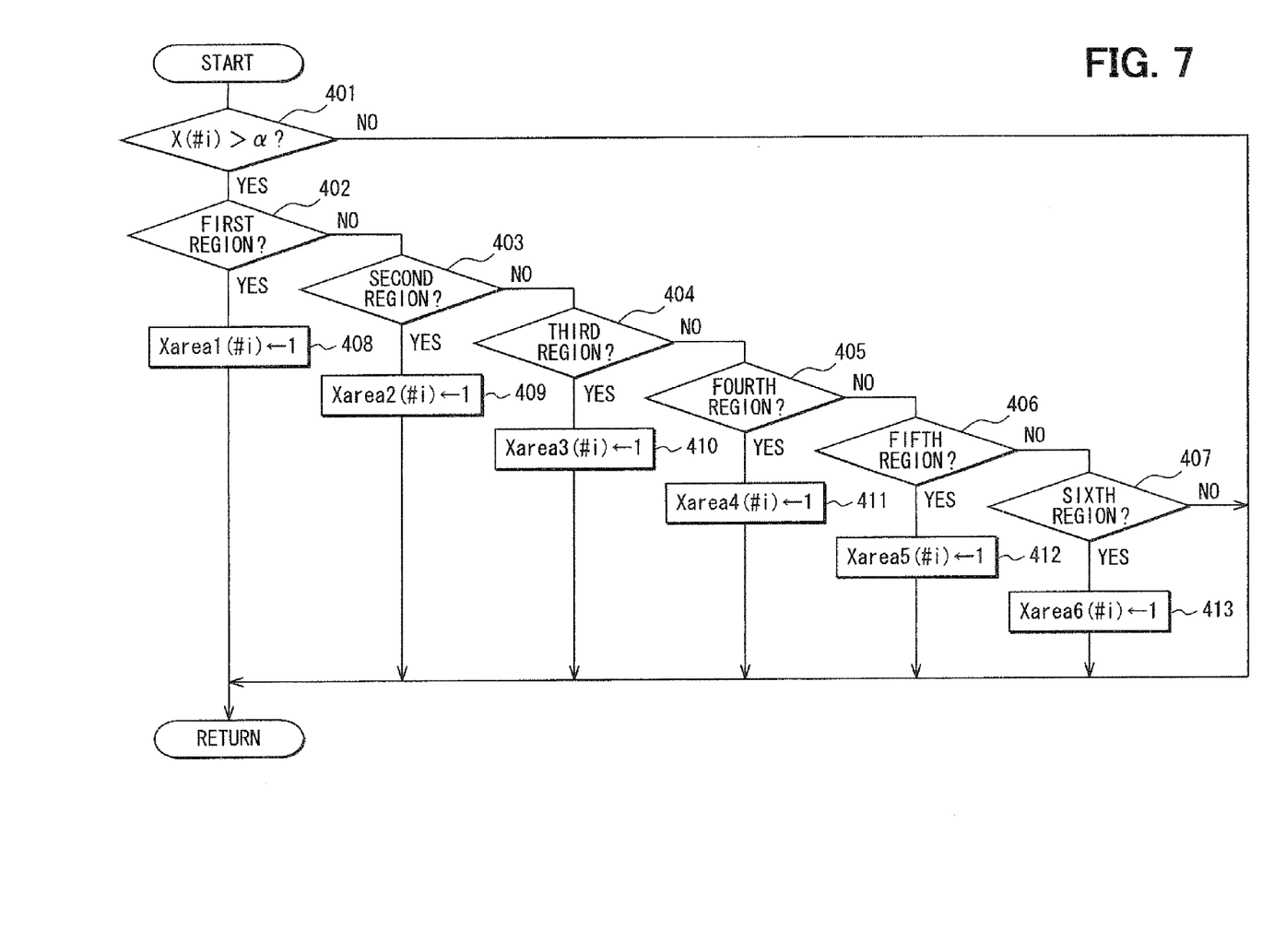
FIG. 7 is a flowchart for explaining a process of an abnormality detection routine according to a second embodiment.
Figure 8:
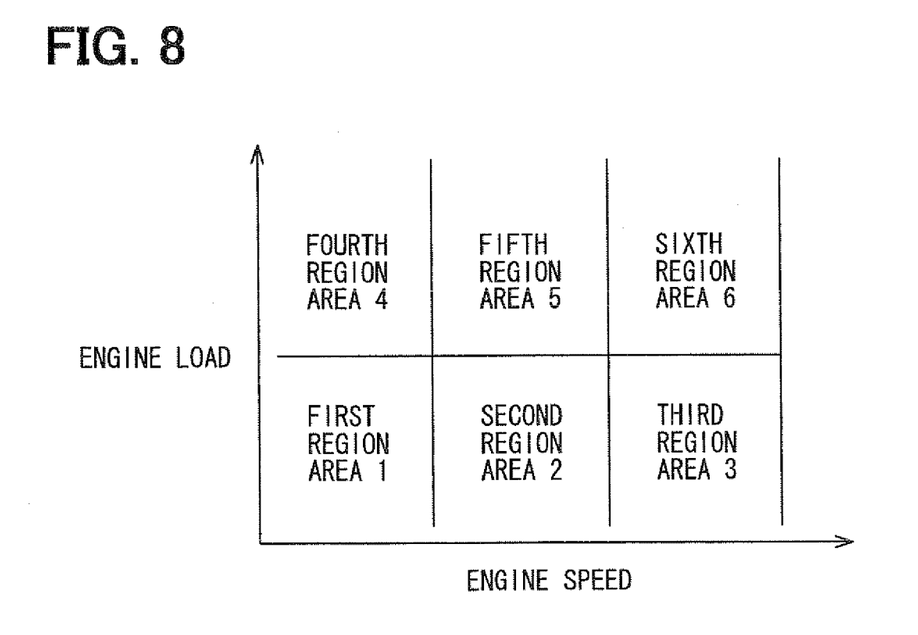
FIG. 8 is a chart showing a map of an abnormality diagnosis area.

Referring to FIGS. 6 to 8, a second embodiment will be described. In the second embodiment, the cylinder deviation X(#i) of each cylinder is estimated based on the output of the air-fuel ratio sensor 37 with respect to every abnormality diagnosis region which is respectively defined according to an operation condition of the engine. When the cylinder deviation X(#i) exceeds the decision value α in all abnormality diagnosis regions, it may be determined that an abnormality occurs in the cylinder.

In a cylinder abnormality diagnosis main routine shown in FIG. 6, when the cylinder deviation estimation condition is established, the cylinder deviation estimation routine shown in FIG. 4 is executed. A cylinder deviation X(#i) of the i-th cylinder #i is computed for every abnormality diagnosis region (step 101-104).

Then, the procedure proceeds to step 105 in which an abnormal detection routine shown in FIG. 7 is executed. In step 401 of the abnormality detection routine, it is determined whether the cylinder deviation ΔX(#i) of the i-th cylinder #i is larger than the decision value α

When the answer is Yes in step 401, the procedure proceeds to steps 402-407 in which it is determined which abnormality diagnosis region the present engine driving region is. An abnormality diagnosis region map shown in FIG. 8 has six regions AREA1-AREA6 according to the engine driving condition (engine speed and engine load).

When it is determined that the present engine driving region is in the first region AREA1 in step 402, the procedure proceeds to step 408 in which a first abnormality flag Xarea1 (#i) of the i-th cylinder #1 is set as "1".

When it is determined that the present engine driving region is in the second region AREA2 in step 403, the procedure proceeds to step 409 in which a second abnormality flag Xarea2(#i) of the i-th cylinder #1 is set as "1".

When it is determined that the present engine driving region is in the third region AREA3 in step 404, the procedure proceeds to step 410 in which a third abnormality flag Xarea3 (#i) of the i-th cylinder #1 is set as "1".

When it is determined that the present engine driving region is in the fourth region AREA4 in step 405, the procedure proceeds to step 411 in which a fourth abnormality flag Xarea4(#i) of the i-th cylinder #1 is set as "1".

When it is determined that the present engine driving region is in the fifth region AREA5 in step 406, the procedure proceeds to step 412 in which a fifth abnormality flag Xarea5 (#i) of the i-th cylinder #1 is set as "1".

When it is determined that the present engine driving region is in the sixth region AREA6 in step 407, the procedure proceeds to step 413 in which a sixth abnormality flag Xarea6 (#i) of the i-th cylinder #1 is set as "1".

Then, the procedure proceeds to step 106a in FIG. 6. In step 106a, it is determined whether the cylinder deviation X(#i) exceeds the decision value α in all abnormality diagnosis regions AREA1-AREA6 according to whether the first to sixth abnormality flags Xarea1(#i)-Xarea6(#i) are set to "1".

When the answer is Yes in step 196a, the procedure proceeds to step 107 in which it is determined that the abnormality occurs in the i-th cylinder #i.

In a case that the detected air-fuel ratio deviates from the actual air-fuel ratio due to a variation of the engine driving condition, an accuracy of a cylinder abnormality diagnosis based on the output of the air-fuel ratio sensor 37 may be deteriorated in a region where the deviation becomes relatively large.

According to the second embodiment, the cylinder deviation X(#i) is estimated based on the output of the air-fuel ratio sensor 37 at every diagnosis region which is defined according to the engine driving condition. When the cylinder division X(#i) of a specified cylinder exceeds the decision value α, it is determined that an abnormality has occurred in the specified cylinder. Hence, even when the accuracy of the abnormality diagnosis is deteriorated based on the output of the air-fuel ratio sensor 371 the cylinder abnormality diagnosis is accurately performed.

Third Embodiment

Figure 9:
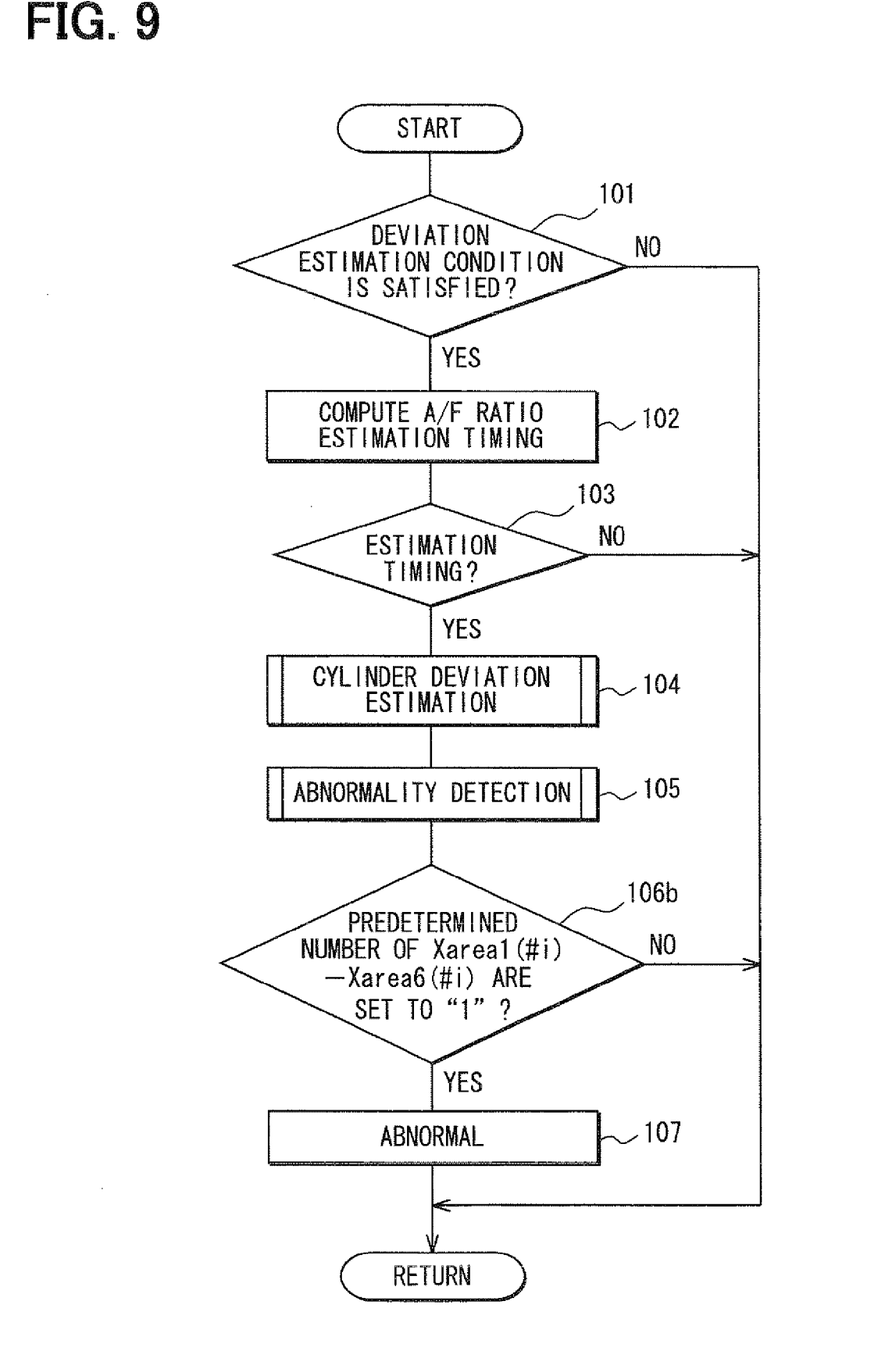
FIG. 9 is a flowchart for explaining a process of a cylinder abnormality estimation main routine according to a third embodiment.

Referring to FIG. 9, a third embodiment will be described hereinafter. According to a third embodiment, when the cylinder deviation X(#1) exceeds the decision value α in predetermined abnormality diagnosis regions of a plurality abnormality regions, it is determined that an abnormality occurs in the cylinder.

In a cylinder abnormality diagnosis main routine shown in FIG. 9, the cylinder deviation estimation routine shown in FIG. 4 is performed to compute the cylinder deviation X(#i) of the i-th cylinder #i with respect to every abnormality diagnosis region (steps 101-104).

Then, the procedure proceeds to step 105 in which abnormality detection routine shown in FIG. 7 is performed. When it is determined that the cylinder deviation ΔX (#i) of the i-th cylinder #i exceeds the decision value α, the abnormality flag Xarea(#i) of the i-th cylinder #1 is set to "1"

Then, the procedure proceeds to step 106b in which it is determined that the cylinder deviation X(#i) exceeds the decision value α in a predetermined areas of the first to sixth abnormality diagnosis areas AREA1-AREA6 (for example, four areas), according to whether a predetermined number of the first to sixth abnormality flags Xarea1(#i)-Xarea6(#i) are set to "1".

When the answer is Yes in step 106b, the procedure proceeds to step 107 in which it is determined that an abnormality occurs in the i-th cylinder #1.

According to the third embodiment, even if an accuracy of diagnosis based on the output of the air-fuel ratio sensor 37 is deteriorated, it can be well determined whether an abnormality exists in each cylinder. The accuracy of the cylinder abnormality diagnosis is enhanced.

In the second and the third embodiment, when the cylinder deviation ΔX(#i) exceeds the decision value α, the abnormality flag Xarea(#i) is set to "1". Alternatively, when the number of case in which the cylinder deviation ΔX(#i) exceeds the decision value α is larger than a predetermined value, the abnormality flag Xarea(#i) can be set to "1".

In the second and third embodiments, the cylinder deviation is estimated based on the output of the air-fuel ratio sensor 37 while the air-fuel-ratio dither control is performed. Alternatively, the air-fuel ratio of each cylinder is estimated based on the output of the air-fuel ratio sensor 37 while the dither control is performed. When the air-fuel ratio of a specific cylinder exceeds a predetermined decision value in the all abnormality diagnosis areas or more than a predetermined number of abnormality diagnosis area, it can be determined that an abnormality occurs in the specific cylinder.

In the second and third embodiments, the air-fuel ratio and the cylinder deviation are computed based on the output of the air-fuel ratio sensor 37 while performing the dither control. The way of computing the air-fuel ratio and the cylinder deviation can be suitably changed. For example, the detected value of the air-fuel ratio sensor 37 is modeled by multiplying a history of the estimated air-fuel ratio and detected air-fuel ratio at the exhaust confluent portion 36 by a predetermined weight. Based on the model, the air-fuel ratio and the cylinder deviation can be estimated.

In the second and third embodiments, single air-fuel ratio sensor is provided in the exhaust gas confluent portion to estimate the air-fuel ratio of each cylinder and the cylinder deviation. The air-fuel ratio sensor can be provided in the exhaust manifold of each cylinder, and the air-fuel ratio and the cylinder deviation of each cylinder can be computed based on the outputs of the air-fuel ratio sensors of each cylinder.

In the first to third embodiments, the present invention is applied to a four-cylinder engine. The present invention can be applied to a two-cylinder engine, three-cylinder engine, and a five-cylinder engine.

What is claimed is:

1. An abnormality diagnosis apparatus for an internal combustion engine comprising:
    an air-fuel ratio sensor provided in a confluent portion of exhaust gas discharged from each cylinder of the internal combustion engine, and detecting air-fuel ratio of the exhaust gas;
    an information detecting means for estimating an air-fuel ratio of each cylinder or a deviation in the air-fuel ratio between the cylinders based on an output of the air-fuel ratio sensor while an air-fuel-ratio dither control is performed for compulsorily varying the air-fuel ratio of each cylinder by a predetermined variation in a rich direction or a lean direction; and
    an abnormality determination means for determining that an abnormality occurs in a specified cylinder when a number of times in which the air-fuel ratio of the specified cylinder estimated by the information detecting means or the deviation in the air-fuel ratio of the specified cylinder exceeds a decision value is greater than a predetermined number.

2. An abnormality diagnosis apparatus for an internal combustion engine comprising:
    an air-fuel ratio sensor detecting an air-fuel ratio of an exhaust gas of the internal combustion engine;
    an information detecting means for estimating an air-fuel ratio of each cylinder or a deviation in the air-fuel ratio between the cylinders based on an output of the air-fuel ratio sensor, while an air-fuel dither control is performed for compulsorily varying the air-fuel ratio of each cylinder by a predetermined variation in a rich direction or a lean direction, with respect to every region of a plurality of abnormality diagnosis areas which is defined according to an engine driving condition; and
    an abnormality determination means for determining that an abnormality occurs in a specified cylinder when the air-fuel ratio estimated by the information detecting means or the deviation in the air-fuel ratio of the specified cylinder exceeds a decision value in all abnormality diagnosis areas.

3. An abnormality diagnosis apparatus for an internal combustion engine comprising:
    an air-fuel ratio sensor detecting an air-fuel ratio of an exhaust gas of the internal combustion engine;
    an information detecting means for estimating an air-fuel ratio of each cylinder or a a deviation in the air-fuel ratio between the cylinders based on an output of the air-fuel ratio sensor, while an air-fuel dither control is performed for compulsorily varying the air-fuel ratio of each cylinder by a predetermined variation in a rich direction or a lean direction, with respect to every region of a plurality of abnormality diagnosis areas which is defined according to an engine driving condition; and
    an abnormality determination means for determining that an abnormality occurs in a specified cylinder when the air-fuel ratio estimated by the information detecting means or the deviation in the air-fuel ratio of the specified cylinder exceeds a decision value in a predetermined number of the abnormality diagnosis area or more.

4. A method of diagnosing an abnormality for an internal combustion engine comprising:
    providing an air-fuel ratio sensor in a confluent portion of exhaust gas discharged from each cylinder of the internal combustion engine;
    detecting an air-fuel ratio of the exhaust gas using the air-fuel ratio sensor;
    estimating an air-fuel ratio of each cylinder or a deviation in the air-fuel ratio between the cylinders based on an output of the air-fuel ratio sensor while an air-fuel-ratio dither control is performed for compulsorily varying the air-fuel ratio of each cylinder by a predetermined variation in a rich direction or a lean direction; and
    determining that an abnormality occurs in a specified cylinder when a number of times in which the estimated air-fuel ratio of the specified cylinder or the deviation in the air-fuel ratio of the specified cylinder exceeds a decision value is greater than a predetermined number.

5. A method of diagnosing an internal combustion engine comprising:
    detecting an air-fuel ratio of an exhaust gas of the internal combustion engine using an air-fuel ratio sensor;
    estimating an air-fuel ratio of each cylinder or a deviation in the air-fuel ratio between the cylinders based on an output of the air-fuel ratio sensor, while an air-fuel dither control is performed for compulsorily varying the air-fuel ratio of each cylinder by a predetermined variation in a rich direction or a lean direction, with respect to every region of a plurality of abnormality diagnosis areas which is defined according to an engine driving condition; and
    determining that an abnormality occurs in a specified cylinder when the estimated air-fuel ratio or the deviation in the air-fuel ratio of the specified cylinder exceeds a decision value in a predetermined number of the abnormality diagnosis areas.

6. The method as in claim 5, wherein exceeding the decision value in the predetermined number of the abnormality diagnosis areas is accomplished by exceeding the decision value in all of the plurality of abnormality diagnosis areas.

* * * * *